Patented May 19, 1931

1,805,945

UNITED STATES PATENT OFFICE

WILLIAM F. GEHRIG, OF BERKELEY HEIGHTS, NEW JERSEY

DETONATING FIREWORK COMPOSITION

No Drawing.   Application filed March 5, 1928.   Serial No. 259,378.

This invention relates to fireworks, which are set in action by means of friction, or impact, or heat, and which during combustion thereof produces a succession of explosive detonations or reports; the action taking place in such a manner that the article does not explode in mass but burns with a relatively slow combustion accompanied by rapid intermittent, small and harmless explosions.

Heretofore such form of fireworks have been made with poisonous yellow phosphorus, potassium chlorate and an organic binding material, such as shellac or gum.

In order to avoid the use of the poisonous yellow phosphorus, it has been proposed to use sulphur phosphorous compounds and particularly sesquisulphide of phosphorus as the active agent with oxygen producing element in the form of potassium chlorate or its equivalent, the mixture being bound together in intimate mixture by a cementitious binder comprising an organic gum and magnesium oxide. It has been found, however, that such a form of binder is not altogether satisfactory, for the reason that the finished article is sensitive to climatic changes, tending to crumble and deteriorate in damp or humid weather.

It is an object of the instant invention to provide an ingredient which will overcome the tendency of the finished product to deteriorate under changing climatic or weather conditions, but will remain firm and hard at all times so as to be properly operative when put to the use for which it is intended; and to this end I use an organic gumlike binder and a medium for making it hard and firm when it has been dried and for preserving it in that condition.

It is a further object of the present invention to provide, in an explosive of the character described, a binder in the form of magesium oxide and gum arabic and a conditioner for keeping the binder and final product in hard and dry condition after it has been dried, said conditioner being potassium dichromate.

Other objects and advantages of the invention will be apparent from the following general and particular descriptions of the ingredients and compositions of the invention and of the method of bringing them together in making the products of the invention.

The binder of magnesium oxide and gum arabic when it has potassium dichromate, in the proportions hereinafter set forth, mixed therewith is non-hygroscopic and produces a hard cementitious material throughout which the phosphorous sulphur compound and oxygen producing materials can be dispersed and retained in that closely incorporated relation to effect the character of combustion producing the successive or intermittent small explosions or reports rather than slow flaming combustion which it is desired to avoid. And it will be, and will continue to be, hard, dry and non-hygroscopic through various changes in climatic conditions such as changes of temperature and changes to and from high degrees of humidity when potassium chlorate is used as the oxygen producing material to which reference is made above.

In making up the novel firework composition of this invention, a water mixture of potassium dichromate, magnesium oxide, and gum arabic is made to which is added potassium chlorate and phosphorous sesquisulphide, the ingredients being thoroughly intermixed. To this mixture there can be added a filler such as sand or clay; or preferably a mixture of sand and clay. The thoroughly intermixed composition is then formed into discs or other shapes or spread on a suitable surface and dried.

Preferably, the phosphorous sesquisulphide (or its equivalent), before being introduced into the composition of the invention, is transformed into crystals of appropriate size, that is, fairly coarse grains, by dissolving in carbon bisulphide or other suitable solvent and recrystallizing it therefrom at a rate suitable to produce the desired size crystals. Equivalents of the phosphorous sesquisulphide which can be used in the compositions and products of the invention are the mono, tri, tetra, and penta sulphides of phosphorus. The potassium chlorate is preferably used in the powdered form.

In the preferred form of the invention a water insoluble coating or film is provided over each of the crystals of phosphorous sesquisulphide to protect them from the water used in the cement mixture. This is necessary because, as is well known, phosphorous sesquisulphide, like other phosphorous sulphur compounds, is decomposed by water. This protection is particularly necessary in the compositions of the invention in which chlorates are used, because the latter produces mixtures with sulphur which are very free burning and which can destroy or deleteriously effect the functions of the composition in producing series of deteriorating explosions. Further, chlorites, which can be formed from the chlorates in the mixture, will act to decompose the sulphur phosphorous compounds. The coatings or film on the sulphur phosphorous crystals is effective as protection against these results and effects. This coating or film can also serve to aid the cementing material in protecting these materials from atmospheric moisture, particularly in moist climates where the finished composition may be subjected to moisture condensed from the air. The film or coating produced, while effective in protecting the phosphorous sesquisulphide from moisture, will not detract from its function in producing detonating explosions, rather it will aid in that function by somewhat confining the material so that the explosions give loud reports. Further, the protective film or coating will not prevent or retard contact between the phosphorous sesquisulphide and the oxygen produced for explosive action therewith because the film or coating at localized places will be removed or destroyed or made pervious to the oxygen by friction or by heat used to set off a series of explosions or by heat or force of an explosion at an adjacent part.

Materials which I find suitable for coating phosphorous sesquisulphide crystals for use in an explosive designed to produce a series of detonations or loud reports are cellulose acetates, cellulose nitrates, for example, collodion, and resinous gums such as kauri, copal, shellac or other material which can be taken up by and deposited in a film from a suitable solvent, other than water, and which when deposited in a film is effectively impervious to water.

To produce a film or coating of collodion thereon the phosphorous sesquisulphide crystals can be dipped in a collodion bath and, after being drained from excess collodion, set to dry at room or raised temperature. Similarly a dry coating or film of other cellulose nitrate preparation, or cellulose acetate, or resin gum such as kauri or copal can be applied with suitable solvent such as alcohol, ether, petroleum oils, carbon bisulphide, benzene, etc., and dried therefrom.

The phosphorous sesquisulphide crystals can also be protected by dipping them in a water gel which is in the liquid state previous to setting, draining off excess jelly, and setting to dry or jell in a cool place. Bone jelly, calf's foot or the like are suitable. Although these contain water they are effective in moisture protection because they take on water by hydrolysis when they set and after they set.

As an example of the composition of the invention, the ingredients are mixed together in the following proportions by weight:

| | |
|---|---|
| Potassium dichromate | 3 to 5 parts |
| Gum arabic | ½ to 1 part |
| Potassium chlorate | 30 to 35 parts |
| Magnesium oxide | 30 to 35 parts |
| Phosphorous sesquisulphide | 10 to 12 parts |
| Beach sand | 3 to 5 parts |
| Pipe clay | 5 to 8 parts |

These ingredients can be added together and intermixed with water in the manner above set forth to form a thick paste which is formed into discs or bodies of desired size, for example, into discs one quarter inch thick and one half inch in diameter, which are dried at temperatures of from 40° to 70° C.; or the paste can be disposed on paper or cloth strips or sheets in the form of segregated spots or pellets; or the paste can be dispersed on or in a fuse material; in any case when dried the same will provide a combustible composition or mixture which, when ignited, will burn in such a manner to produce the desired series of rapid succession of detonations or explosions.

The composition, when dried, provides a relatively hard, dense mass which is non-hygroscopic so that it keeps well under various climatic or weather conditions, and will remains properly operative for the purpose intended.

The composition of the kind described, in addition to the keeping qualities above mentioned has the highly desired advantage of being free from poisonous substances.

It is to be understood that chlorates other than potassium chlorate can be used, such for example, as chlorates or perchlorates of sodium, magnesium or calcium, or potassium perchlorate; and that, in place of the magnesium oxide, magnesium carbonate can be used, or oxides or carbonates of sodium, calcium or barium can be used. It is also to be understood that dichromates of sodium or other equivalent can be used instead of the potassium dichromate. The clay which is suitable for use can be pipe clay, china clay, ball clay, Spanish clay, or other clay. Also the proportions of the ingredients can be varied substantially from those set forth in the example without depriving the composition of the advantages, uses, and results above set forth for the cited example.

It is also to be undersood that gums other than gum arabic can be used with the magnesium oxide to form with potassium dichromate a new binder which is hard, firm, and nonhygroscopic and which will continue to have these characteristics for a long or indeterminate period of time and in moist climates and in climates having wide changes in humidity and temperature. The others suitable are gums well known to be substitutes for gum arabic for various purposes among which are gum tragacanth, sandarac, agar-agar and so on.

Having thus described my invention, what I claim is:

1. A non-hygroscopic firework composition adapted to produce successive detonations when ignited, consisting in the herein named ingredients in the approximate proportions by weight as follows:

| | |
|---|---|
| Potassium chlorate | 35 parts |
| Magnesium oxide | 35 parts |
| Phosphorous sesquisulphide | 12 parts |
| Gum arabic | 1 part |
| Potassium dichromate | 5 parts |
| And a filler | 8 parts |

2. A non-hygroscopic firework composition adapted to produce successive detonations when ignited, consisting in the herein named ingredients in the approximate proportions by weight as follows:

| | |
|---|---|
| Potassium chlorate | 35 parts |
| Magnesium oxide | 35 parts |
| Phosphorous sesquisulphide | 12 parts |
| Gum arabic | 1 part |
| Potassium dichromate | 5 parts |
| Clay | 5 parts |
| Sand | 3 parts |

3. A non-hygroscopic firework composition adapted to successive detonations when ignited, consisting in the herein named ingredients in the approximate proportions by weight as follows:

| | |
|---|---|
| Potassium chlorate | 35 parts |
| Magnesium oxide | 35 parts |
| Phosphorous sesquisulphide | 12 parts |
| Gum arabic | 1 part |
| Potassium dichromate | 5 parts |
| Pipe clay | 5 parts |
| Sand | 3 parts |

4. A non-hygroscopic firework composition adapted to produce successive detonations when ignited, consisting in the herein named ingredients in the approximate proportions by weight as follows:

| | |
|---|---|
| Potassium chlorate | 35 parts |
| Magnesium oxide | 35 parts |
| Phosphorous sesquisulphide | 12 parts |
| Gum arabic | 1 part |
| Potassium dichromate | 5 parts |
| And a filler | 8 parts | said sulphur phosphorous compound being in crystals with a coating on said crystals of a material insoluble in water.

5. A non-hygroscopic firework composition adapted to successive detonations when ignited, consisting in the herein named ingredients in the approximate proportions by weight as follows:

| | |
|---|---|
| Potassium chlorate | 35 parts |
| Magnesium oxide | 35 parts |
| Phosphorous sesquisulphide | 12 parts |
| Gum arabic | 1 part |
| Potassium dichromate | 5 parts |
| Pipe clay | 5 parts |
| Sand | 3 parts | said sulphur phosphorous compound being in crystals with a coating on said crystals of a material insoluble in water.

In testimony, that I claim the invention set forth above I have hereunto set my hand this 2nd day of March, 1928.

WILLIAM F. GEHRIG.